(12) United States Patent
Harper

(10) Patent No.: US 11,653,790 B2
(45) Date of Patent: May 23, 2023

(54) ACCELERATED SLOW ROASTING APPARATUS

(71) Applicant: Scott A. Harper, Mechanicsburg, PA (US)

(72) Inventor: Scott A. Harper, Mechanicsburg, PA (US)

( * ) Notice: Subject to any disclaimer, the term of this patent is extended or adjusted under 35 U.S.C. 154(b) by 355 days.

(21) Appl. No.: 16/947,024

(22) Filed: Jul. 15, 2020

(65) Prior Publication Data

US 2022/0015575 A1  Jan. 20, 2022

(51) Int. Cl.
| | |
|---|---|
| *A47J 37/07* | (2006.01) |
| *A23B 4/052* | (2006.01) |
| *A23L 5/10* | (2016.01) |
| *F24C 15/16* | (2006.01) |
| *F24B 13/00* | (2006.01) |
| *F24B 13/02* | (2006.01) |
| *F24C 15/00* | (2006.01) |

(52) U.S. Cl.
CPC .......... *A47J 37/0786* (2013.01); *A23B 4/052* (2013.01); *A23L 5/17* (2016.08); *F24B 13/004* (2013.01); *F24B 13/02* (2013.01); *F24C 15/002* (2013.01); *F24C 15/168* (2013.01); *A47J 2037/0795* (2013.01)

(58) Field of Classification Search
CPC ......... A47J 37/04; A47J 37/049; A47J 37/06; A47J 37/0688; A47J 37/07; A47J 37/0704; A47J 37/0768; A47J 37/0786; A47J 37/0795; A47J 2037/0795; F24C 15/002; F24C 15/02; F24C 15/023; F24C 15/025; F24C 15/028; F24C 15/168; F24B 13/004; F24B 13/02; A23B 4/052; A23B 4/0523; A23L 5/17; Y02A 40/928
See application file for complete search history.

(56) References Cited

U.S. PATENT DOCUMENTS

| | | | | |
|---|---|---|---|---|
| 4,819,614 A | * | 4/1989 | Hitch | A47J 37/0704 126/41 R |
| 4,862,792 A | * | 9/1989 | Lerma, Jr. | A47J 37/0704 99/402 |
| 6,039,039 A | * | 3/2000 | Pina, Jr. | A47J 37/04 126/339 |

(Continued)

FOREIGN PATENT DOCUMENTS

| | | | | |
|---|---|---|---|---|
| CA | 2803540 A1 | * | 8/2013 | A47J 37/0704 |
| FR | 2970633 A1 | * | 7/2012 | A47J 37/0704 |

*Primary Examiner* — Hung D Nguyen
(74) *Attorney, Agent, or Firm* — Carson Patents; Gregory D. Carson

(57) ABSTRACT

The Accelerated Slow Roasting Apparatus is a device for slow-and-low cooking a whole previously butterflied-prepared animal carcass comprising a closed cooking chamber with a plurality of adjustable air vents arranged on the bottom edge of the cooking chamber and a plurality of adjustable opening vents on a vertical side of the lid of the cooking chamber, and a slide out cooking grate with adjustable rails to support the grate while out of the cooking apparatus, a plurality of removable cooking fuel trays, wherein the cooking grate is positioned between twenty-five and forty centimeters above the cooking fuel trays to enable a flame-flare-up free, time-accelerated, slow-and-low cooking of the animal carcass in half, or less than half, of the traditional sixteen to twenty-two hours cooking time.

2 Claims, 3 Drawing Sheets

(56) References Cited

U.S. PATENT DOCUMENTS

| | | | |
|---|---|---|---|
| 9,433,321 B2* | 9/2016 | Piazzi | A47J 37/0704 |
| 10,595,540 B1* | 3/2020 | Knight | A23B 4/0523 |
| 2015/0004297 A1* | 1/2015 | Pothetes | A47J 37/049 |
| | | | 99/339 |
| 2016/0235078 A1* | 8/2016 | Farina | A47J 37/0658 |
| 2017/0014000 A1* | 1/2017 | Minnich | A47J 37/0786 |
| 2019/0150460 A1* | 5/2019 | Wirtz | A23B 4/052 |
| 2020/0229642 A1* | 7/2020 | George | A23L 5/15 |

* cited by examiner

ACCELERATED SLOW ROASTING APPARATUS

TECHNICAL FIELD OF THE INVENTION

This invention relates generally to meat cooking and roasting equipment and methods. This invention relates specifically to slow roasting apparatuses, devices and techniques for cooking meats that are used to create that culinary delight, pull-apart tender juicy smoked and slow cooked roasted pig. This invention relates to barbecue cookers, smokers, roasters, and ovens.

This invention further relates generally to methods of cooking meats that are used to produce slow cooked, smoked, roasted meat that is sufficiently tender so as to separate into bit-sized finger peel-able segments of cooked meat to eat. This invention further relates specifically to slow roasting techniques, and means and methods to accelerate the slow cooking process.

BACKGROUND

Slow roasting meats is a long standing favorite method of cooking preparation for whole pig cooking. Pig roasting is done with charcoal, propane, and gas over low heat cooking for a long time. Pig roast cooking times of sixteen to twenty-two or more hours are common. This low-and-slow cooking method does produce that delicious fall off the bone meat but the current apparatuses, devices, and techniques are all subject to two hazards in addition to the very long cooking time.

The two additional hazards of slow-and-low cooking are these: [1] letting the meat remain in the temperature danger zone for too long results in bacteria growth making the meat hazardous, and [2] burning/scorching the meat when drippings from the meat drop onto the cooking fuel (charcoal, wood, or gas) causing fire flare-ups that burn and char the meat. The burning and char hazard causes waste in the meat that it destroys, as well as faster consumption of cooking fuel used by the flare-up flame. The temperature hazard is a potential cause of illness if meat is left at too low of a temperature for too long of a time.

The temperature danger zone for meat is between 41 degrees and 135 degrees Fahrenheit. The most rapid bacteria growth occurs between 70 degrees and 125 degrees Fahrenheit. The longer the meat remains in the danger temperature range, the greater the risk that bacteria can grow and reach unsafe levels. Unsafe levels of bacteria spoil the meat and make it dangerous for consumption. Many, if not all, of today's low-and-slow cooking apparatuses, devices, and techniques can result in letting the internal temperature of the meat remain in the temperature danger zone too long.

What is needed is a device that can cook the whole pig in the low-and-slow style at a faster rate of completion, without the hazards of traditional means.

BRIEF SUMMARY OF THE INVENTION

The Accelerated Slow Roasting Apparatus is a device for slow-and-low cooking a whole previously butterflied-prepared animal carcass comprising a closed cooking chamber with a plurality of adjustable opening vents arranged on a bottom edge on a vertical side of said cooking chamber comprising a hinged lid with a plurality of adjustable opening vents on a vertical side of said lid, an upper hinged access door wherein a slide out cooking grate and a plurality of height adjustable cooking grate slide-out rails and support posts enable removal of said animal carcass from said cooking chamber without opening said lid, a lower hinged access door wherein a plurality of removable cooking fuel trays, wherein said cooking grate is positioned between twenty-five and forty centimeters above said cooking fuel trays to enable a flame-flare-up free, time-accelerated, slow-and-low cooking of said animal carcass in half, or less, of the traditional sixteen to twenty-two hours cooking time.

The Accelerated Slow Roasting Apparatus is used as a closed cooking chamber with no chimney to maximize initial cooking heat to enable prevention of low temperature exposure for said animal carcass and retain cooking heat and smoke enabling time accelerated cooking of said animal carcass in half, or less, of the traditional sixteen to twenty-two hours cooking time.

The Accelerated Slow Roasting Apparatus is used with a method of preparation and cooking to enable a flame-flare-up free, time-accelerated, slow-and-low cooking of said animal carcass in half, or less than half, of the traditional sixteen to twenty-two hours cooking time. Accelerated slow-and-low cooking is enabled by fully lighting the cooking fuel (charcoal) at the beginning of the method to ensure high (hot) initial cooking temperatures of 350 degrees Fahrenheit, or more, ensuring that the meat being cooked is not exposed to dangerously low temperatures for long periods of time.

The Accelerated Slow Roasting Apparatus cooking method is comprised of opening said lid and upper access door, pulling out said cooking grate, greasing or lubricating said cooking grate with a cooking grease or lubricant, loading and adding flavor seasoning to a butterflied-prepared animal carcass with skin side facing down toward the cooking fuel trays, opening said lower access door and adding a six to ten kilogram bag of charcoal briquettes to each cooking fuel tray, adding a charcoal lighting fluid, igniting said charcoal on fire, allowing said charcoal briquettes to burn off any lighting fluid fumes and begin to show ash on the outside edges of said charcoal briquettes, spreading said charcoal evenly throughout the cooking fuel trays so as to provide even elevated cooking heat under the animal carcass to be cooked, closing said lower access door, partially opening the side vents on the bottom vertical sides of the cooking chamber adjacent to each cooking fuel tray, pushing in said cooking grate, closing said lid and upper access door, and cooking to an internal temperature of 195 to 200 degrees in five to eight hours, depending on the mass of the butterflied-prepared animal carcass being cooked.

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Figure 1:
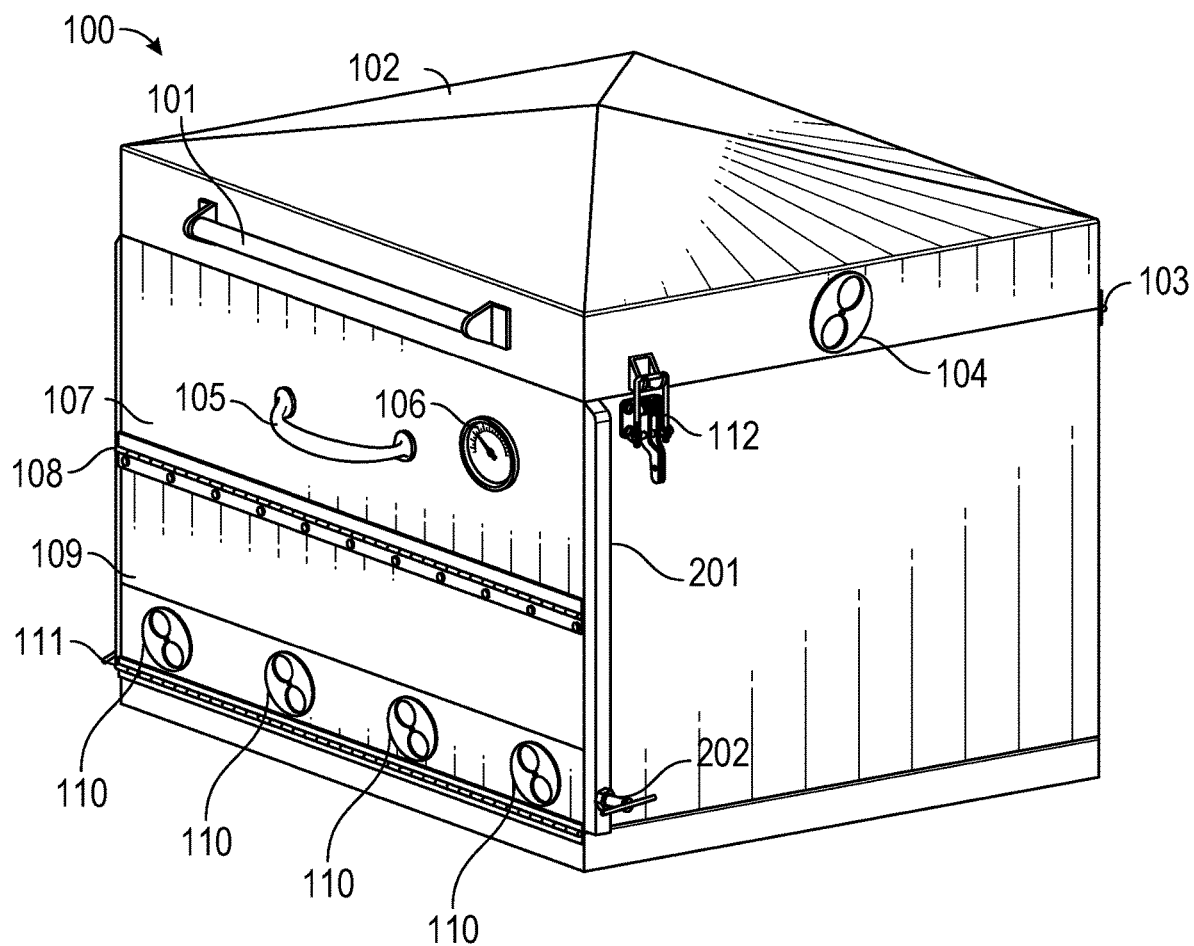
FIG. 1 shows a three-dimensional perspective view of the Accelerated Slow Roasting Apparatus with the lid and vents closed facing the front right corner.
Figure 2:
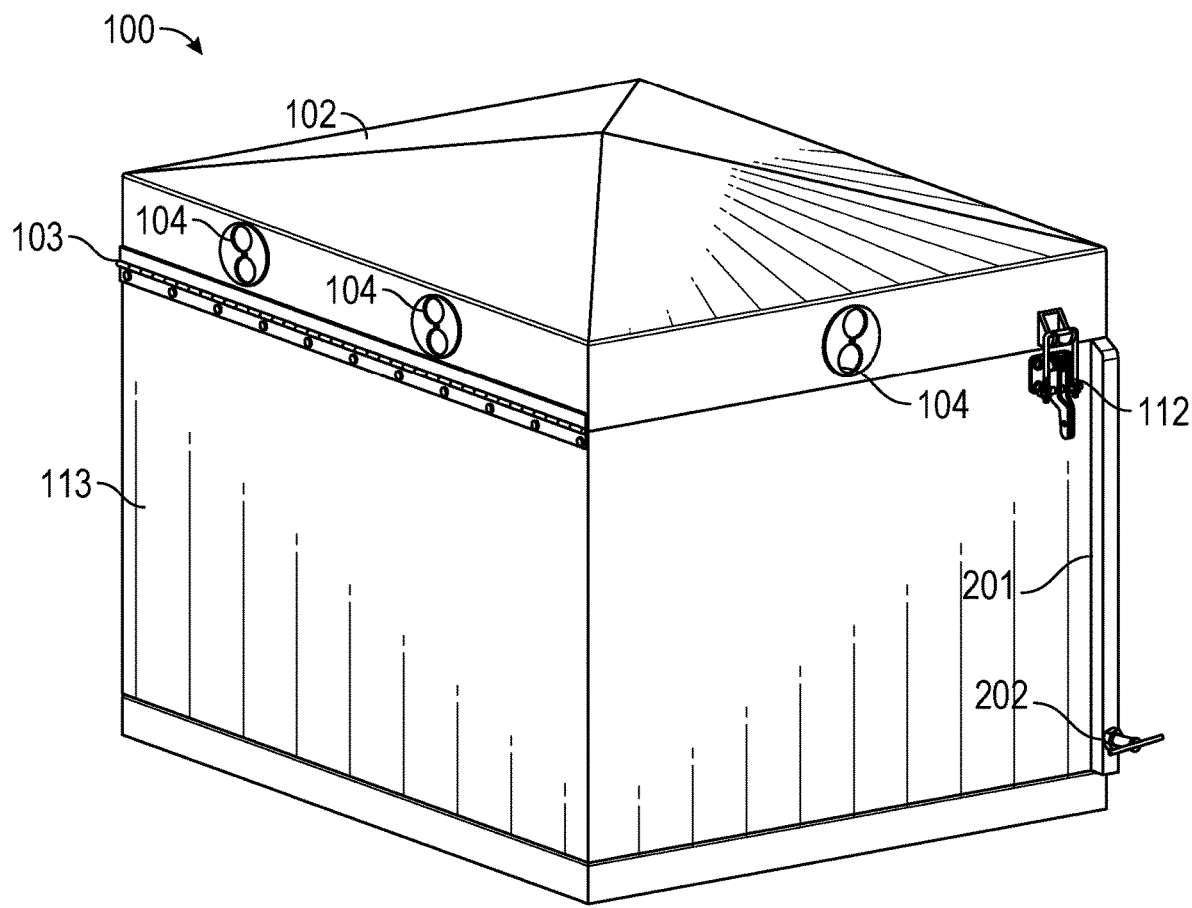
FIG. 2 shows a three-dimensional perspective view of the Accelerated Slow Roasting Apparatus with the lid and vents closed facing the rear left corner.
Figure 3:
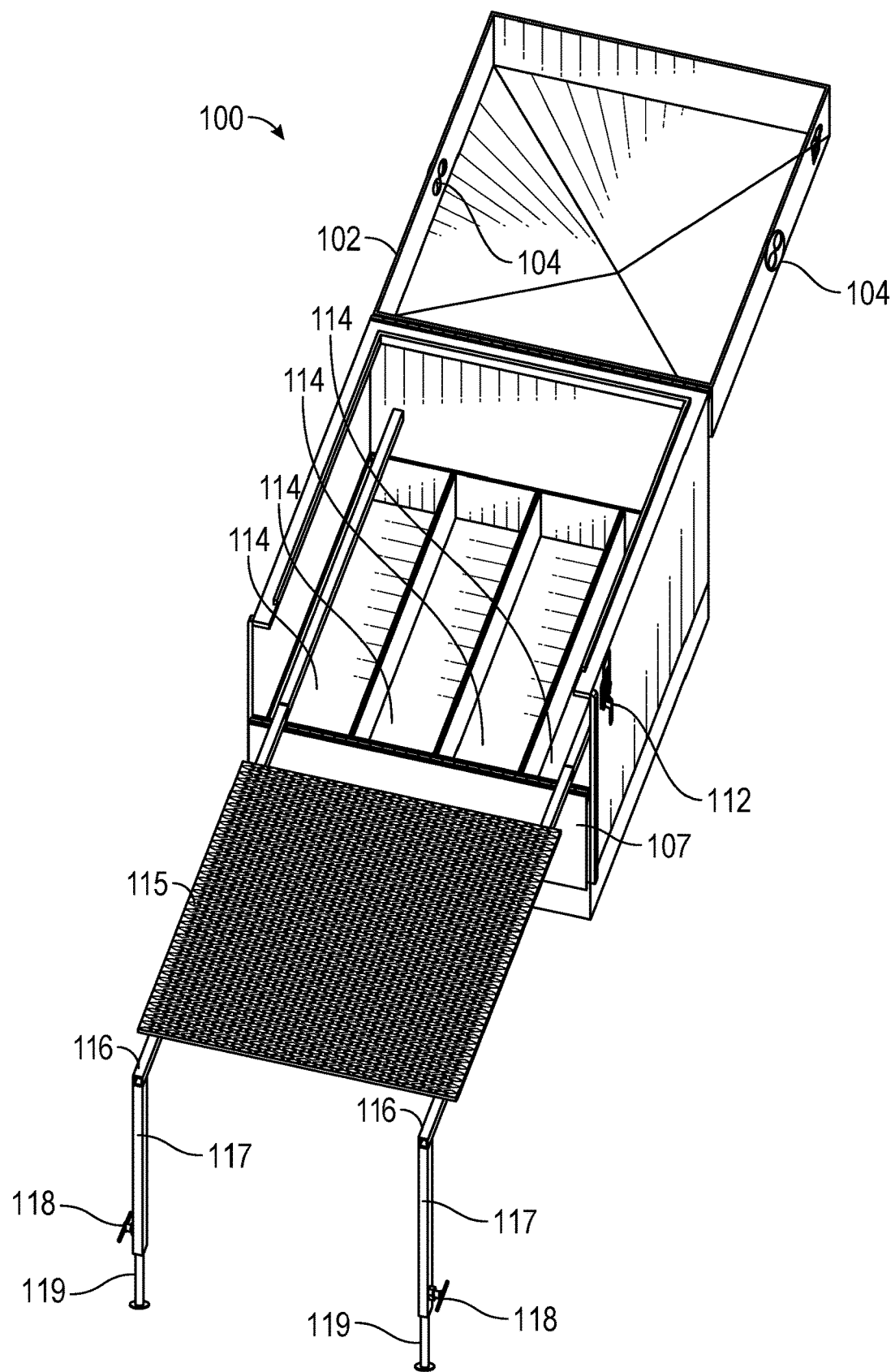
FIG. 3 shows a three-dimensional perspective view of the Accelerated Slow Roasting Apparatus from above with the lid open, and cooking surface pulled out to show the interior cooking fuel trays.

The Accelerated Slow Roasting Apparatus is a closed cooking chamber assembled from the elements as shown in FIGS. 1, 2, and 3 used for accelerated slow-and-low cooking of meats.

As shown in FIG. 1, Element 100 is an embodiment of the Accelerated Slow Roasting Apparatus. Element 101 is a cooking chamber lid handle. Element 102 is a cooking chamber lid. Element 103 is a cooking chamber lid hinge. Element 104 is a cooking lid vertical side slide-opening air vent. Element 105 is an upper access door handle. Element 106 is a cooking temperature indicator. Element 107 is an upper access door to access the cooking grate (Element 115, shown in FIG. 3). Element 108 is an upper access door hinge. Element 109 is lower access door to access the cooking fuel trays (Element 114, shown in FIG. 3). Elements 110 are bottom edge vertical slide opening air vents. Element 111 is a lower access door hinge. Element 112 is a lid securing/locking latch. Optionally, Element 201 is an adjustable leg, with threaded adjustment setting pin, Element 202.

As shown in FIG. 2, Element 100 is an embodiment of the Accelerated Slow Roasting Apparatus. Element 102 is a cooking chamber lid. Element 103 is a cooking chamber lid hinge. Element 104 is a cooking lid vertical side slide opening air vent. Element 112 is a lid securing/locking latch. Element 113 is the back panel of the cooking chamber. Optionally, Element 201 is an adjustable leg, with threaded adjustment setting pin, Element 202.

As shown in FIG. 3, Element 100 is an embodiment of the Accelerated Slow Roasting Apparatus. Element 102 is a cooking chamber lid. Element 104 is a cooking lid vertical side slide opening air vent. Element 112 is a lid securing/locking latch. Elements 114 are the cooking fuel trays. Element 115 is the cooking grate. Element 107 is an upper access door to access the cooking grate (Element 115). Elements 116 are the cooking grate pullout rails to guide and support said cooking grate while positioned in or out of the apparatus (100). Elements 117 are the pullout rails adjustable vertical leg housings. Elements 118 are threaded set screws for the pullout rail adjustable legs. Elements 119 are the adjustable leveling legs for the pullout rails supporting the cooking grate.

In an embodiment, the cooking grate (115) is positioned twenty-five to forty centimeters above the top of the cooking fuel trays (114) to prevent flareups from occurring when liquid fat from the carcass being cooked drips onto the cooking fuel. In the preferred embodiment the cooking grate (115) is positioned thirty centimeters, or more, vertically above the top of the cooking fuel trays (114).

In the preferred embodiment, the Accelerated Slow Roasting Apparatus (100) is used for accelerated slow-and-low cooking of a butterflied-prepared pig using the following method.

The process is the same for all sizes of pigs. The cooking time varies depending on the size of the pig. For example, the time to cook is shorter for smaller pigs (under 50 kilograms) compared to larger pigs (over 100 kilograms). Smaller pigs will cook in approximately six hours compared to eight hours for larger pigs.

Open the lid (102) with the lid handle (101), then open the upper hinged access door (107), and connect the two cooking grate pullout rails (116) to the pullout rails adjustable legs (117, 118, and 119) and adjust for level.

Slide the cooking rack grate (115) out onto the rails (116).

Place the contents of one bag of charcoal in each of the cooking fuel trays (114). Pile said charcoal in the middle of each tray and apply liberal amounts of odorless charcoal starting fluid to the charcoal piles and then light on fire.

Allow the charcoal to catch fire, turn mostly gray, and de-fume. Usually 20 to 30 minutes. Then spread charcoal throughout the whole tray with a hoe or shovel or by grabbing some built-in charcoal tray handles and vigorously pulling and pushing the trays in and out of the Accelerated Slow Roasting Apparatus (100) to disperse the charcoal evenly over the bottom surface of the cooking fuel trays (114).

Close the lower access door (109) and open the bottom sliding air vents (110) up to full open position.

While the roasting rack is out and on the rack stands, lubricate the roasting rack with cooking grease or lubricant.

Place the pre-butterflied pig on the cooking grate (115) with the skin side facing down. A pre-butterflied pig has head on, legs off at the limb joints, and the spine cut open so the pig can lay flat on its back with the legs spread out, not up.

Apply cooking spray lubricant to the back of pig. Apply salt to the skin and allow time to rest while the charcoal is settling down (allowing said charcoal briquettes to burn off any lighting fluid fumes and begin to show ash on the outside edges of said charcoal briquettes).

After the charcoal settles down, flip the pig, apply any seasoning rub as desired to the inside of the body cavity of the pig, and slide the rack into the roaster with the pig on top of the cooking grate (115).

The key to no flame-flare-ups is that the pig being roasted is more than thirty centimeters away from the heat in the cooking fuel trays and as a result very little juice escapes the pig cavity and drips on the heat. No drippings means no flare ups. Also, no drippings means the pig meat is cooking in its own juices (fat). If done correctly, when the pig is fully cooked, the cavity should be full of delicious liquid which can be removed with a baster and put in a container for use as a sauce.

Then, close the upper access panel door (107), close the lid (102), open the lid vents (104) half-way. Test heat by placing your hand ten to fifteen centimeters away from an open vent (104) and if you can't hold your hand there for more than one to two-seconds then the temperature should be fine. If not then increase the heat by opening the bottom vents (110) and/or the lower access door (109) to allow more air flow to generate more heat.

Keep the lid (102) and access panels (107 and 109) closed and take a break for a couple of hours. At the end of three hours is when the meat cooking "smoke" will start to become very noticeable to everyone within a fifteen meter radius. The lack of a chimney on the present invention functions to retain heat and smoke, similar to an imu (underground cooking oven) Kālua pig cooking pit that is above ground and portable.

Peek (look) at the cooking pig by tipping the lid (102) slightly open. Do not keep the lid (102) open very long, and do not repeat peeking as it can extend cooking time.

Depending on the size of the pig, you can start checking the meat temperature at the five hour mark to judge progress. If a big (more than 100 kilograms) pig is being cooked, it may take seven to eight hours for the meat temperature goal of 195 to 200 degrees. Small pigs should be fully cooked in six hours or less.

Open the lower access door (109) and give each cooking fuel tray (114) a smooth back and forth pull and push to redistribute the remaining charcoal and boost cooking temperature without kicking up too much ash. There should be no need to add more charcoal absent a situation where a big pig is stuffed and is being cooked with additional and/or other meats on the cooking grate (115). If you have to add more charcoal, do not add it under the areas of the cooking pig in order to avoid adding the taste of fuel to the meat.

When the pig is done, you can open the upper access door (107), and connect the two cooking grate pullout rails (116) to the pullout rails adjustable legs (117, 118, and 119) and adjust for level. Allow the cooked pig to rest for thirty minutes. Remove any liquid in the cavity and save for use as serving sauce. The meat can be pulled by hand; no knives are needed. Just put on serving gloves and dig in. Grab big hunks and place in big aluminum trays to be pulled further.

After most of the meat is pulled off, start to tear off the skin and place those pieces in a tray and serve that as well.

In the preferred embodiment, the liberal application of cooking spray on the cooking grate (115) at the beginning allows the skin to be released from the roasting rack easily.

In the preferred embodiment, cardboard is placed under the roasting grate (115) to absorb any drippings that may occur while picking the meat for serving.

In the preferred embodiment, a pressure washer is used when cleaning the roasting rack/grate (115).

In the preferred embodiment, as described above, the heat is very hot (350 degrees Fahrenheit, or more) initially, which sears the outside of the meat. Then, after a few hours of peak heat (approximately 350 degrees Fahrenheit), the cooking temperature slowly diminishes, but the cooked temperature of the meat gradually reaches optimum temperature of 195 to 200 degrees Fahrenheit.

In an alternate embodiment the invention is installed upon and/connectively attached to a towable wheeled trailer. In an alternate embodiment the invention is a portable above ground imu Kālua pig cooking means.

Although the invention has been explained in relation to various embodiments, it is to be understood that many other possible modifications and variations can be made without departing from the spirit and scope of the invention.

The invention claimed is:

1. An Accelerated Slow Roasting Apparatus for slow-and-low cooking a whole previously butterflied-prepared animal carcass comprising a closed cooking chamber with a plurality of adjustable opening vents arranged on a bottom edge on a vertical side of said cooking chamber comprising a hinged lid with a plurality of adjustable opening vents on a vertical side of said lid, an upper hinged access door wherein a slide out cooking grate and a plurality of height adjustable cooking grate slide-out rails a support post enable removal of said animal carcass from said cooking chamber without opening said lid, a lower hinged access door wherein a plurality of removable cooking fuel trays, wherein said cooking grate is positioned between twenty-five and forty centimeters above said cooking fuel trays to enable a flame-flare-up free, time-accelerated, slow-and-low cooking of said animal carcass in half, or less, of the traditional sixteen to twenty-two hours cooking time.

2. The apparatus of claim 1, used as a closed cooking chamber with no chimney to maximize initial cooking heat to enable prevention of low temperature exposure for said animal carcass and retain cooking heat and smoke and enable time-accelerated cooking of said animal carcass in half, or less than half, of the traditional sixteen to twenty-two hours cooking time.

* * * * *